April 17, 1962 M. L. HISE ETAL 3,030,080

APPARATUS FOR REMOVING DISCRETE SOLID MATERIAL FROM A PIT

Filed Oct. 8, 1958 2 Sheets-Sheet 1

INVENTORS

BY MARVIN L. HISE & MAX A. WELCH

APPARATUS FOR REMOVING DISCRETE SOLID MATERIAL FROM A PIT
Filed Oct. 8, 1958 2 Sheets-Sheet 2
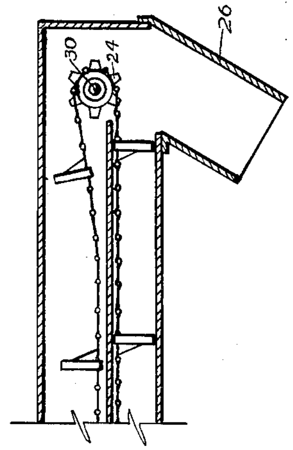
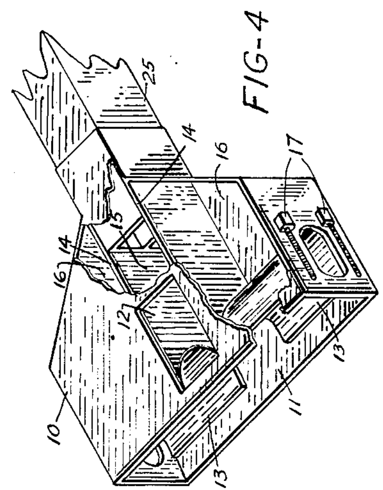
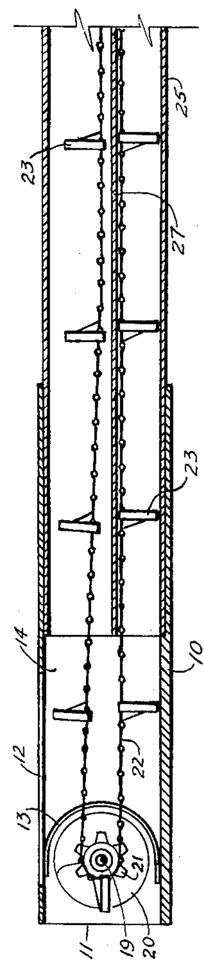
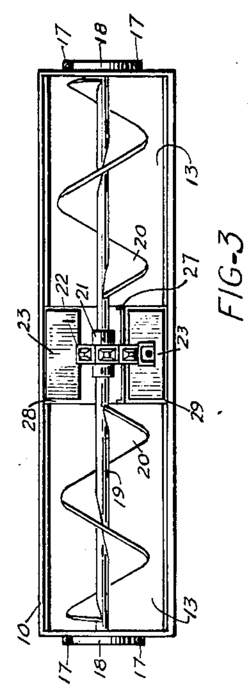
INVENTORS
BY MARVIN L. HISE
&
MAX A. WELCH United States Patent Office 3,030,080 Patented Apr. 17, 1962

1

3,030,080
APPARATUS FOR REMOVING DISCRETE SOLID MATERIAL FROM A PIT

Marvin L. Hise and Max A. Welch, Blackwell, Okla.; said Welch assignor to Ponca City Industrial Foundation, Ponca City, Okla., a corporation of Oklahoma Filed Oct. 8, 1958, Ser. No. 767,077
2 Claims. (Cl. 259—6)

This invention relates to apparatus for removing discrete solid matter from a pit. More specifically, the invention relates to apparatus especially adapted for the removal of mud, sand, gravel, clay, sludge or other discrete solid matter from a pit.

Many cities have ordinances which require the use of a trap or pit to prevent mud, sand, gravel, clay and other discrete solid matter from entering the sewage system. Service stations and garages which wash vehicles and equipment are required to have such a pit or trap in which mud, sand, gravel, clay and sludge collects. The discrete solid matter which has collected in these pits or traps must be removed periodically. In some areas these pits must be cleaned from two to eight times a month.

The usual method for cleaning such pits is for a man to enter the pit and manually load the sludge into buckets for removal, a dirty, time consuming and distasteful job.

An alternate method employs the use of large, expensive, truck mounted mud pumps owned and operated by a firm commercially engaged in cleaning such pits, cesspools, and the like. This service is quite expensive and relatively time consuming.

It is therefore an object of this invention to provide a novel, inexpensive and rapid apparatus for removing discrete solid matter from pits which substantially eliminates manual operation.

It is a further object to provide a novel apparatus for cleaning settling pits wherein the mud, sand, gravel and other solid material accumulated in the pit is mixed with water, lifted from the pit, and dumped into a receptacle.

A further object of this invention is to provide a portable apparatus which is capable of removing mud, sand, gravel and other solid or liquid materials from a settling pit or trap with a minimum of expense and without the need of manual labor.

Additional objects and advantages of this invention if not specifically set out will become apparent to one skilled in the art during the course of the following description.

The present invention relates broadly to apparatus for removing discrete solid matter from a pit. In performing the method, the discrete solid matter such as mud, sand, gravel or clay which has accumulated in the pit, frequently in the form of a solid mass, is broken up and loosened. A liquid such as water is added to the loosened discrete solid matter and the liquid and discrete solid matter are agitated to form a mixture. The settling pit usually contains some water; however, it may be necessary to add more water or other liquid as the discrete solid matter is loosened and mixed. The mixture of liquid and solid matter is in a form in which it may be easily removed from the pit. The removal may be performed by a suitable conveying means. This apparatus may be used to remove discrete solid matter from any type of depression or pit.

The present invention relates broadly to a portable apparatus for removing discrete solid matter from a pit. The apparatus comprises a bell housing having a pair of horizontally positioned and opposed augers for loosening and agitating accumulated mud, sand, gravel and other solid material, mixing it with water or other liquid, which normally covers these solid materials, and moving the mixture toward an endless chain conveyor which is centrally positioned perpendicular to and between the opposed augers.

2

The bell housing encloses the augers and lower section of the endless chain conveyor. The feed end of the bell housing is open to receive the sludge, and the upper extremity is constructed so as to connect to a casing which houses the upper portion of the endless chain conveyor. An opening, in the top side of the bell housing centrally positioned therein so as to be directly over the lower portion of the endless chain conveyor also facilitates entry of the sludge and water into the bell housing. The bell housing prevents the augers from digging into the sludge too rapidly allowing better mixing, regulating the rate of feed, and preventing overloading of the apparatus, thus producing more efficient operation.

The endless chain conveyor consists of an endless chain, a plurality of evenly spaced flights attached thereto, an outside casing enclosing the chain and flights, and a divider positioned longitudinally within the casing forming two passages having unequal cross sectional area. The smaller of the two passages is adapted to receive the flights in such a manner as to allow formation of a liquid seal during upward movement of the mixture. This liquid seal tends to produce an area of decreased pressure at the base of the endless chain conveyor, into which the mixture moves, aided by the inwardly propelling action of the augers. The mixture of discrete solid material and liquid is carried upwardly by means of the flights, through the smaller of the two passages to a spout where it is discharged into a suitable receptacle.

A more complete understanding of the device may be gained by reference to the following descriptions and accompanying drawings.

In the drawings:

FIGURE 2 is a sectional view of the invention.

FIGURE 3 is a view of the feed end of the bell housing.

FIGURE 4 is an isometric view of the bell housing.

Figure 1:
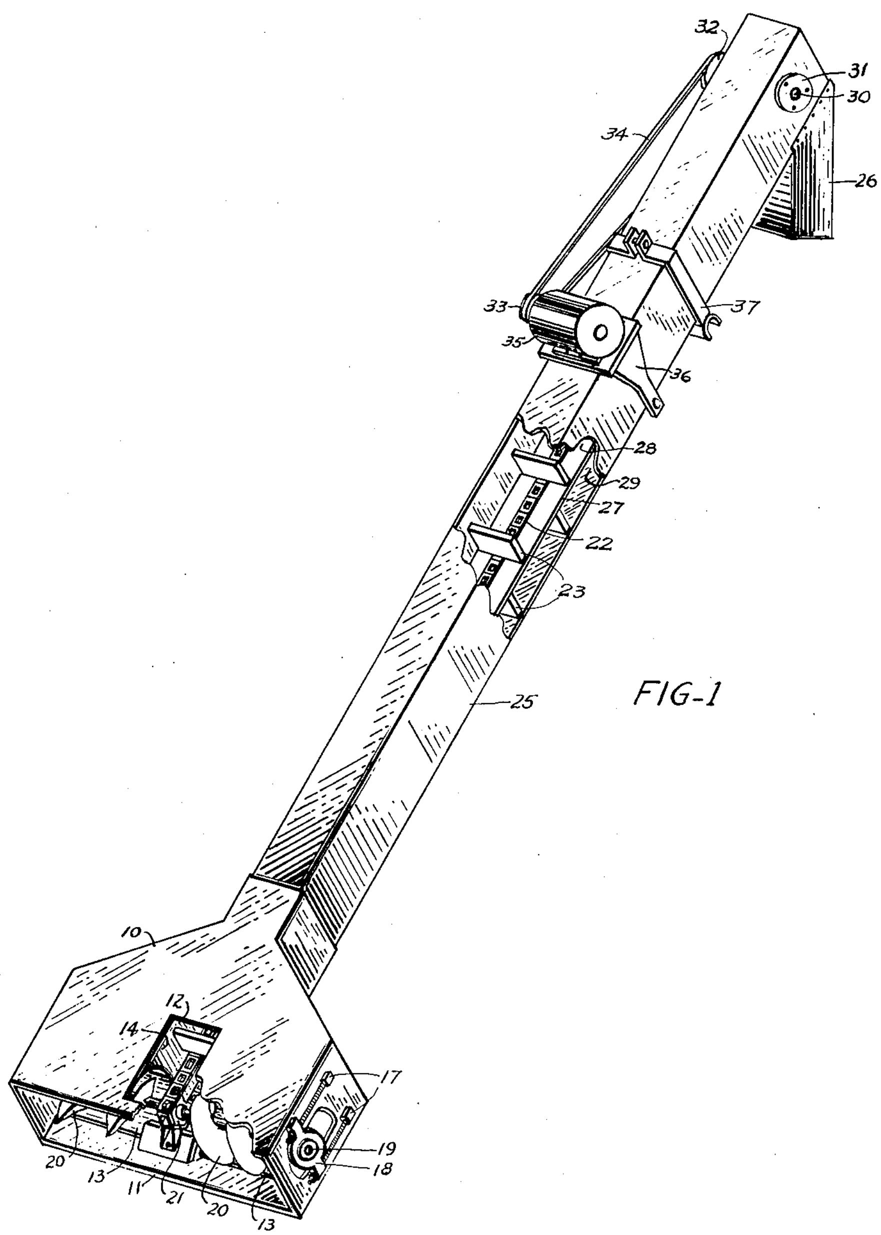
FIGURE 1 is an isometric view of the invention.

In a preferred illustration of this invention numeral 10 designates a bell housing open at the feed end 11, having an opening 12 on the top side thereof, a pair of curved auger backing plates 13 shown in FIGURES 2 and 4, a pair of parallel plates 14, connected at one end to the curved auger backing plates 13 and at the other end to the sides of the bell housing 10 to form a passageway 15 and two air spaces 16. Chain tighteners 17 are mounted on either side of the bell housing 10 supporting bearings 18 which are journalled to receive shaft 19. Directionally opposed augers 20, best shown in FIGURE 3, and sprocket 21 are securely fastened to shaft 19. Endless chain 22 having a plurality of spaced flights 23 engages sprocket 21 at the feed end and sprocket 24 (see FIGURE 2) at the discharge end. A casing 25 enclosing chain 22 and flights 23 and having a spout 26 is attached to bell housing 10. A divider 27 is positioned longitudinally within the casing forming passages 28 and 29 having unequal cross sectional area such that the cross sectional area of passage 29 is approximately the same as the flat surface area of flight 23. Sprocket 24 is mounted on shaft 30, for which bearings 31 are journalled. Attached to one extremity of shaft 30 is a driven pulley 32 connected to driving pulley 33. Driving pulley 33 is attached by means of belt 34 to motor 35. Motor 35 is attached to mount 36 which may be slidably positioned on casing 25 thus serving as a tightener for belt 34.

A bracket 37 for mounting the apparatus on a receptacle such as a wheelbarrow, barrel, pickup truck or other suitable device, is slidably positoned on casing 25.

In operation, the apparatus described functions through its various parts to remove either liquids, solids or a mixture of liquids and solids from a pit and dumps the material into a receptacle for easy removal from the premises. The apparatus is attached to the tailgate of a pickup truck or any other suitable receptacle by means of mounting bracket 37. The mounting bracket 37 steadies the apparatus and allows it to swing vertically so that the feed end may automatically adjust to the level of the material which is to be removed from the pit. The feed end 11 of the machine is lowered into the pit where it will settle below the water and "float" just below the top level of the sludge or discrete solid material. This "floating" action is accomplished by the novel construction of the bell housing 10 in which two air chambers 16 are formed by the plates 14, sides, top and bottom of the bell housing 10, and the curved backing plates 13. The air chambers 16 are of such size that the resulting buoyant effect is not sufficient to float the feed end 11 of the machine in water, but will suspend it near the surface of the heavier, more viscous sludge. The resulting effect is to place the feed end 11 and the opposed augers 20 in a position just below the surface of the sludge, and to position the opening 12 which is in the top side of bell housing 10 in the water overlying the sludge. The sludge in the pit is ordinarily a viscous mixture of mud, grease, sand and gravel, sometimes so viscous as to overload the machine if fed directly into it without prior dilution with water. The mixing of the sludge with water tends to prevent an overload by constantly providing a more fluid mixture. The buoyant effect of the bell housing automatically positions the feed end of the apparatus so as to regulate the mixture being fed to the apparatus, thus assuring a smooth, constant operation and substantially eliminating the problem of possible overload.

When the apparatus has been positioned in the pit, motor 35 is started and power is transmitted through driving pulley 33 and belt 34 to driven pulley 32. Driven pulley 32 is keyed or splined to shaft 30. Sprocket 24, keyed to shaft 30, turns in conjunction with driven pulley 32. Engaging sprocket 24 is an endless link chain 22, which transmits power from sprocket 24 to sprocket 21, shaft 19, and augers 20 and conveys flights 23 downward through passageway 28, around sprocket 21, thence upward through passageway 29. Sprocket 21 and augers 20 are secured to shaft 19 so that these elements are turned as a single unit by endless chain 22. The directionally opposed augers 20 churn and mix the sludge and water and propel the mixture inwardly toward the endless chain conveyor, where it is carried upward through passageway 29 by the flights 23 and discharged through spout 26 into a receptable.

The flights 23 are designed to fit into passageway 29 so that when the apparatus is in operation removing a fluid or semi-fluid material a liquid seal is formed between the edges of a flight 23 and the sides of passageway 29. This piston like fit and liquid seal results in the formation of an area of low pressure at the inlet end of passageway 29 into which the sludge or mixture of discrete solid matter and liquid readily moves, aided by the inwardly propelling action of augers 20.

The motor 35 is securely mounted on motor mount 36 which may be positioned anywhere along casing 25, thus operating as an adjustable manual tightener for belt 34.

The spout 26 can be easily removed from casing 25, thus allowing access to the working parts of the apparatus at the upper extremity, facilitating maintenance work and inspection.

Alternate conveyor means such as a conventional helical screw or auger within a cylindrical enclosure may be utilized with the bell housing and augers, in lieu of the endless chain and flight conveyor described above to remove the mixture of liquid and discrete solid material from the pit.

While we have described a preferred embodiment of our invention and several modifications thereof, it will be recognized that other modifications of this invention may be made without departing from the principles thereof. Such modifications are to be considered as included in the hereinafter appended claims unless these claims by their language expressly state otherwise.

We claim:

1. An apparatus for removing discrete solid matter from a pit comprising: a pair of directionally opposed augers mounted on a shaft, said shaft being journalled for rotation into a bell housing, said bell housing including means to enclose the augers, said bell housing having an opening forming a feed end for the augers, said bell housing having an air chamber therein to achieve a buoyant effect and to prevent said augers from penetrating too deeply into the discrete solid matter, an opening in the top of said bell housing to allow entrance of a liquid into said bell housing, means for rotating said shaft to impart a rotating movement to said augers whereby said augers agitate the discrete solid matter at the feed end of said bell housing, mix said discrete solid matter with the liquid from said opening of the bell housing and move the mixture to a position between said augers; and an endless chain conveying means connected with said shaft and said endless chain conveying means positioned between and adjacent to said augers so as to receive the mixture from the augers and deliver it from the pit.

2. An apparatus for removing discrete solid matter from a pit comprising: a pair of directionally opposed augers mounted on a shaft, said shaft being journalled for rotation into a bell housing, said bell housing including means to enclose, the augers, said bell housing having an opening forming a feed end for the augers, said bell housing having an air chamber therein to achieve a buoyant effect and to prevent said augers from penetrating too deeply into the discrete solid matter, an opening in the top of said bell housing to allow entrance of a liquid into said bell housing, means for rotating said shaft to impart a rotating movement to said augers whereby said augers agitate the discrete solid matter at the feed end of said bell housing, mix said discrete solid matter with the liquid from said opening of the bell housing and move the mixture to a position between said augers; and an enclosed, endless chain conveyor having a plurality of spaced flights, a longitudinally placed partition dividing said enclosed conveyor into two passages having unequal cross-sectional area, said enclosed, endless chain conveyor positioned between and adjacent to said augers and connected with said shaft so as to receive the mixtures from the augers and to carry said mixture upward through the smaller of said two passages to the top of said conveyor and deliver it from the pit.

References Cited in the file of this patent

UNITED STATES PATENTS

| | | |
|---|---|---|
| 599,101 | Kanne | Feb. 15, 1898 |
| 953,624 | Kendle | Mar. 29, 1910 |
| 1,085,676 | Finch | Feb. 3, 1914 |
| 1,106,038 | Fruhling | Aug. 4, 1914 |
| 2,013,276 | Luce | Sept. 3, 1935 |
| 2,415,617 | Werner | Feb. 11, 1947 |
| 2,722,759 | Cosenza | Nov. 8, 1955 |

FOREIGN PATENTS

| | | |
|---|---|---|
| 473,767 | Germany | Mar. 22, 1929 |